United States Patent
Harvey et al.

[11] Patent Number: 5,985,959
[45] Date of Patent: Nov. 16, 1999

[54] STABILIZED VINYL CHLORIDE POLYMER COMPOSITIONS

[75] Inventors: Heather Blue Harvey, Hyde; Malcolm Thomas John Mellor, Bolton, both of United Kingdom; Franciscus Jeannette Maria Leonardus Peters, Eygelshoven; Gererd Hubert Frans Schmets, Horn, both of Netherlands

[73] Assignee: Akcros Chemicals, Manchester, United Kingdom

[21] Appl. No.: 08/952,352

[22] PCT Filed: May 15, 1996

[86] PCT No.: PCT/GB96/01156

§ 371 Date: Feb. 25, 1998

§ 102(e) Date: Feb. 25, 1998

[87] PCT Pub. No.: WO96/36663

PCT Pub. Date: Nov. 21, 1996

[30] Foreign Application Priority Data

May 19, 1995 [GB] United Kingdom ........... 9510139

[51] Int. Cl.⁶ .............. C08K 5/45; C08K 5/3415; C08K 5/15
[52] U.S. Cl. ............. 524/84; 524/104; 524/105; 524/111
[58] Field of Search ............... 524/104, 84, 111, 524/105

[56] References Cited

U.S. PATENT DOCUMENTS 5,744,525  4/1998  Harvey et al. ............... 524/84

FOREIGN PATENT DOCUMENTS 217214   4/1987  European Pat. Off. .
2078761  1/1982  United Kingdom .

OTHER PUBLICATIONS

WO, A, 95/16739 (AKCROS Chemicals) Jun. 22, 1995.

*Primary Examiner*—Veronica P. Hoke
*Attorney, Agent, or Firm*—Duane Morris & Heckscher LLP

[57] ABSTRACT

The present invention relates to a composition based on polymer and/or co-polymers of vinyl chloride including organotin salts and/or one or more divalent metal salts of a carboxylic acid or phenol, and one or more metal salts of the organic compounds of general formula A:

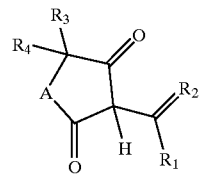

in which $R_1$ represents a linear or branched alkylene or alkenylene radical having up to 20 carbon atoms, an aralkylene radical having from 7 to 20 carbon atoms or an arylene or cycloalkylene radical having from 6 to 20 carbon atoms, the cycloalkylene radicals optionally containing carbon—carbon double bonds; these radicals optionally being unsubstituted or substituted for example by one or more or halogen atoms or hydroxyl groups or, for aryl or cycloalkylene radicals, by one or more methyl, ethyl or methoxy radicals, the above-mentioned radicals optionally modified by the presence in an aliphatic chain of one or more —O—, —CO— or $CO_2$ -chain members or N; $R_2$ represents O,S, $NR_5$ or $NNHR_5$ wherein $R_5$ is defined as $R_1$, H or $C(S)NHR_6$ wherein $R_6$ is defined as $R_1$ or H; $R_3$ and $R_4$ are defined as $R_1$ or H and can be the same or different; A is either, O, S or $NR_7$, with $R_7$ defined as $R_1$ and H, with the exception that when A =O, $R_2$=\=O.

8 Claims, No Drawings

STABILIZED VINYL CHLORIDE POLYMER COMPOSITIONS

The present invention relates to stabilised vinyl chloride poisoner compositions.

The temperatures required during the processing of vinyl chloride polymers and co-polymers, by moulding, extruding and casting techniques, are of the order of 180–200° C. These elevated temperatures cause degradation of the polymer leading to undesirable colour formation and detrimental effects on the mechanical properties of the end product.

The problems of degradation may be reduced by the use of additives such as metal inorganic salts and metal carboxylates. Further improvement in the retardation of the detrimental degradation is provided by organophosphites, epoxidised esters or oils, hindered phenolic antioxidants and polyols.

In U.S. Pat. No. 2,307,075 and U.S. Pat. No. 2,669,548 the beneficial effects of adding metal chelates of certain dicarbonyl compounds specifically β-ketoesters are disclosed. GB1,511,621 offers further improvements by the combination of divalent metal salts of carboxylic acids together with a dicarbonyl organic compound. More recently EP46161 covered the use of metal salts of bis β-diketones and compared their performance with Zinc salts of commercially available β-diketones. In U.S. Pat. No. 4,221,697 metal salts of β-diketones are also described.

The present invention seeks to provide an alternative stabilisation system.

According to the present invention there is provided a composition based on polymer and/or co-polymers of vinyl chloride comprising the following compounds expressed by weight percent relative to the weight of polymer/co-polymer used.

a) from 0.1%–5% of one or more organotin salts and/or one or more divalent metal salts of a carboxylic acid or phenol; and b) from 0.001%–5% of one or more metal salts of the organic compounds of general formula A.

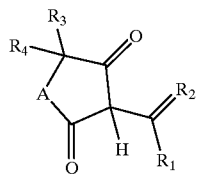

in which $R_1$ represents a linear or branched alkylene or alkenylene radical having up to 20 carbon atoms, an aralkylene radical having from 7 to 20 carbon atoms or an arylene or cycloalkylene radical having from 6 to 20 carbon atoms, the cycloalkylene radicals optionally containing carbon-carbon double bonds; these radicals optionally being unsubstituted or substituted for example by one or more halogen atoms or hydroxyl groups or, for aryl or cycloalkylene radicals, by one or more methyl, ethyl and methoxy radicals, the above mentioned radicals optionally also being modified by the presence in an aliphatic chain of one or more —O—, —CO— or —$CO_2$-chain members or N; $R_2$ represents O, S, $NR_5$ or $NNHR_5$ wherein $R_5$ is defined as $R_1$, H or $C(S)NHR_6$ wherein$_6$ is defined as $R_1$ or H; $R_3$ and $R_4$ are defined as $R_1$ or H and can be the same or different; A is either, S or $NR_7$, with $R_7$ defined as $R_1$ and H.

The metals used for the above complexes can be chosen from the alkali or alkaline erths; they may be divalent or monovalent transition metal ions or tetravalent or divalent tin. Those preferred for this invention are barium, cadmium, zinc, magnesium, calcium, sodium. potassium, strontium or tin.

Examples of metal salts based on compound A are give in Table 1.

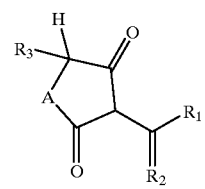

TABLE 1

| | | $R_2$ = O | | | | |
|---|---|---|---|---|---|---|
| Compound | A | $R_1$ | $R_3$ | $M^{n+}$ | Name (all isomers) | Preparation method |
| I | N-phenyl | $CH_3$ | H | Zn(II) | N-phenyl 3-acetylpyrrolidine 2,4 dione, Zinc complex | A |
| II | N-phenyl | " | " | Ca(II) | N-phenyl 3-acetylpyrrolidine 2,4 dione, Calcium complex | B |
| III | N-phenyl | " | " | Ba(II) | N-phenyl 3-acetylpyrrolidine 2,4 dione, Barium complex | A |
| IV | N-phenyl | " | " | Na(I) | N-phenyl 3-acetylpyrrolidine 2,4 dione, Sodium salt | A |

TABLE 1-continued $R_2 = O$

| Compound | A | $R_1$ | $R_3$ | $M^{n+}$ | Name (all isomers) | Preparation method |
|---|---|---|---|---|---|---|
| V | N-phenyl | " | " | K(I) | N-phenyl 3-acetylpyrrolidine 2,4 dione, Potassium salt | A |
| VI | N-phenyl | " | " | Mg(II) | N-phenyl 3-acetylpyrrolidine 2,4 dione, Magnesium complex | A |
| VII | N—⟨phenyl⟩—OCH$_3$ | " | " | Na(I) | N-p-methoxyphenyl 3-acetylpyrrolidine 2,4 dione, Sodium salt | A |
| VIII | " | " | " | K(I) | N-p-methoxyphenyl 3-acetylpyrrolidine 2,4 dione, Potassium salt | A |
| IX | " | " | " | Ca(II) | N-p-methoxyphenyl 3-acetylpyrrolidine 2,4 dione, Calcium complex | B |
| X | N—⟨phenyl⟩—OCH$_3$ | " | " | Na(I) | N-p-methoxyphenyl 3-acetylpyrrolidine 2,4 dione, Sodium salt | A |
| XI | " | " | " | K(I) | N-p-methoxyphenyl 3-acetylpyrrolidine 2,4 dione, Postssium salt | A |
| XII | " | " | " | Ca(II) | N-p-methoxyphenyl 3-acetylpyrrolidine 2,4 dione, Calcium salt | B |
| XIII | N-isopropyl | " | " | Zn(II) | N-isopropyl 3-acetylpyrrolidine 2,4 dione, Zinc complex | A |
| XIV | N-benzyl | " | " | Zn(II) | N-benzyl 3-acetylpyrrolidine 2,4 dione, Zinc complex | A |
| XV | N-phenyl | CH$_2$-phenyl | " | Ba(II) | N-phenyl 3-phenyl acetylpyrrolidine 2,4 dione Barium complex | A |
| XVI | N-phenyl | CH$_3$ | CH$_3$ | Ca(II) | N-phenyl 3-acetyl 5, methyl pyrrolidine 2,4 dione, Calcium complex | B |

The metal salts were all made by 1 of 2 possible synthetic procedures although this does not exclude the possibility that these products can be made by alternative methods. Details of the synthetic procedures used in our laboratories are given for each. The starting organic compound, was, in each case synthesised by the literature preparation given either J.Chem.Soc. (1954), 854 or 832 R N Lacey.

Method A

Potassium (3-acetyl-N-phenylpyrrolidine-2,4-dione)

N-acetoacetyl-N-phenyl-glycine ethyl ester (74.6 g, 0.28 mols) was dissolved in toluene (250 mls). To this mixture was added a suspension of potassium hydroxide in Industrial Methylated Spirit (21.95 g, in 150 mls). The reaction mixture was heated at reflux for 1 hour, after which time the heat was removed and the mixture allowed to cool. Once cold, the solid was isolated by filtration, washed on the filter with diethyl ether (2×50 mls) and sucked dry. The soli d was placed in an oven to dry.

Yield=89%

Method B

N-phenyl-3-acetyl-pyrrolidine-2,4-dione (13.62 g, 0.063 mols) was suspended in deionised water (315 mls). Aqueous ammonia was added (26.3 mls of 32%) was added and the mixture stirred for 1 hour. After this time the solution was filtered and the filtrate diluted with more deionised water (625 mls). An aqueous solution of calcium chloride (3.48 g in 190 mls) was added dropwise with stirring. Once addition was complete the reaction mixture was stirred for a further 30 minutes.

The mixture was reduced to near dryness and the solid isolated by filtration.

Yield=88%

The heat stability of the compounds described in Table 1 in polyvinyl chloride have been evaluated.

The phrase "compositions based in polyvinyl chloride" used herin should be understood to include compositions comprising any homopolymer or co-polymer of vinyl chloride including chlorinated vinyl chloride polymers and optionally any adjuvants employed to facilitate processing or enhance the properties of the end product.

Any suitable organotin salt may be used such as methyl-, butyl-, and octyltin carboxylate, maleic acid half ester and mercaptoester salts.

The divalent metal salts of carboxylic acids preferably comprise barium, cadmium, zinc, calcium, magnesium or (less desirably) lead salts of saturated or unsaturated aliphatic acid or aromatic acids. In the case of zinc. basic (acid deficient) salts may optionally be employed. Barium and calcium salts of phenol or substituted phenols and optionally basic (carbonated) phenate and carboxylate salts of these metals can also be employed. The metal salts are preferably provided in combinations such as barium-cadmium, barium-zinc or calcium-zinc. Suitable salts include acetates, ethyl hexanoates, octoates, stearates, oleates, laurates, palmitates, myristates, ricinoleates, benzoates (including alkyl substituted benzoates) phthalates, phenates and nonyl phenates. Optionally these divalent metal salts can be used in combination with carboxylic acid salts of monovalent metals, for example sodium, potassium and/or trivalent metals, for example aluminium. Furthermore, inorganic metal salts can be included. Such products can be oxides, carbonates, sulphates, perchlorates, magnesium/aluminium and magnesium/aluminium/zinc hydroxycarbonates, calcium/aluminium hydroxycarbonates or calcium/aluminium hydroxyphosphite products.

Option adjuvants include any of the following: organophosphite esters, for example triaryl phosphites such as triphenyl phosphite, tris(nonylphenyl)phosphite, tris(2,4-di-t-butylphenyl)phosphite, alkaryl phosphites such as monooctyl diphenylphosphite, dioctylphenyl phosphite, mixed alkyl nonylphenyl phosphites, trialkyl phosphites such as tridecyl phosphite, trioleyl phosphite, tristeary phosphite, oligo phosphite such as those based on pentaerythritol, dipropylene glycerol and bisphenols.

Antioxidants, for example, phenolic antioxidants such as 2,6-di-t-butyl-4-methylphenol, styrenated phenol, 2,2'-methylenc bis(4-methyl-6-t-butylphenol), 2,2'-bis-(4-hydroxyphenol) propane, octadecyl-3-(3',5'-di-t-butyl-4-hydroxyphenol) propionate. pentaerhritol tetrakis [3',5'-di-t-butyl-4-hydroxyphenol) propionate].

Ultraviolet absorbers, foe example benzophenones such as 2-hydroxy4-methoxybenzophenone, 2-hydroxy-4-octoxybenzophenone, benzotriazoles such as 2-(2'-hydroxy-5'-methylphenyl)benzotriazole, salicylates such as phenyl salicylate, nickel salts such as nickel bis [o-ethyl(3,5-di-t-butyl-4-hydroxybenzyl)]phosphonate, hindered amine s such as bis(2,2,6,6-etramethylpiperidinyl-4)sebacate.

Polyol co-stabilisers such as pentaertritol, dipentaerythritol, tris(hydroxyethyl) isocyanurate, mannitol, sorbitol, trimethylolpropane, glycerol, propylene glycol, ditrimethylolpropane and the esters of these products formed with aliphatic and aromatic monocarboxylic or dicarboxylic acids.

Antistatic agents such as ethylene condensates, carbowax, glycerol monostearates, alkylsulphonates.

Lubricants such as calcium stearate, zinc stearate, fatty acid esters and amides, distearyl phthalate, stearyl alcohol, stearic acid, polyethylene wax.

Flame retardants such as antimony trioxide, aluminium hydroxide, zinc stannate.

The homopolymers and co-polymers can be used in rigid or flexible formulations. In flexible formulations commonly used plasticisers include for example, phthalic acid esters such as dimethyl phthalate, dibutyl phthalate, aliphatic monobasic acid esters such as butyl oleate, glycerol monoleate, butyl stearate, octyl stearate, butyl epoxy stearate, octyl epoxy stearate, epoxidised soya bean oil, epoxidised linseed oil, aliphatic dibasic esters such as diisodecyl adipate, dioctyl adipate, dibutyl adipate, higher molecular weight (polymeric plasticisers) based on dibasic acids would also be included, as would trimellitate esters and phosphoric acid esters such as tributyl phosphate, triphenyl phosphate, tri-2-ethylhexyl phosphate.

In rigid formulations it is possible to include impact modifiers such as, for example, chlorinated polyethylene, butadiene/styrene co-polymers or butadiene/styrene/ acrlonitrile terpolymers. Acrylic impact modifiers and process aids can also be included.

Miscellaneous additives such as fillers and pigments could be used in flexible and rigid polymer applications.

The stabilisers according to the invention can be incorporated at the same time as other adjuvants. Alternatively, they may be combined with certain of the additives to produce a stabiliser composition which can then be subsequently incorporated into the chlorinated polymer. Methods of production of such stabilising combinations are well known within the industry.

Various methods are available for the processing of stabilised PVC formulations these include calendering, rotational moulding, spread coaling, slush moulding, extrusion, injection moulding, blow-moulding. The stabiliser compositions described by the invention can be used in accordance with each of these techniques.

The following example further illustrate the invention:
A. Examples 1–4

The sample compounds were tested in the formulation given below which can be used in the manufacture of bottles.

| Composition A | |
|---|---|
| Suspension polymerised PVC resin (K-57) | 100 |
| Impact Modifier, a co-polymer of methuylmethacrylate butadiene and styrene (sold under the trade name Paraloid BTA736S | 13 |
| Process aid (Paraloid K175) | 1 |
| Epoxidised Soya Bean Oil | 5 |
| Calcium Stearate | 1 |
| Zinc Stearate | 0.7 |
| Tris(nonylphenyl)phosphite | 0.3 |

121 g of this mixture was taken as example 1. For examples 2–4, 121 g of Composition A was combined with 0.02 g of V, I and stearoylbenzovlmethane (sold under the trade name of Rhodiastab 50) respectively.

The mixtures were mixed by hand before being placed on a steam heated rolling mill under the conditions described in Table 2. After the milling time the samples were removed as sheets, test pieces of size 140 mm×20 mm were cut from the prepared sheets and placed in a test oven at 185° C. (Mathis Thermotester Ta-pe LTF-ST). The Yellouness Index (YI of the test sample) was determined according to BS2762: Part 5, Method 530A. The results are shown in Table 3.

TABLE 2

| Mill Conditions | |
|---|---|
| Roll Diameter | 152.4 mm |
| Front roll temperature | 165° C. |
| Back roll temperature | 163° C. |
| Front roll speed | 30 rpm |
| Friction ratio | 1:1 |
| Nip thickness | 0.4 mm |
| Milling time | 3 minutes |

TABLE 3

| | Y.I. after oven test in minutes | | | | | |
|---|---|---|---|---|---|---|
| Example | 0 | 4 | 8 | 12 | 16 | 20 |
| 1 | 18 | 39 | 60 | 70 | 73 | 74 |
| 2 | 8 | 19 | 40 | 50 | 55 | 62 |
| 3 | 7 | 17 | 31 | 42 | 52 | 57 |
| 4 | 11 | 23 | 31 | 44 | 56 | 63 |

B. Examples 5–8

Tne example compounds were tested in a flexible clear PVC formulation stabilised by a Calcium/Zinc Hydrotalcite solid system.

| Composition B | |
|---|---|
| Suspension polymerised PVC resin (K 71) | 100 |
| Dioctyl phthalate | 50 |
| Calcium Stearate | 0.5 |
| Zinc Stearate | 0.5 |
| Mg/Al/Zn Hydroxycarbonate (sold under the tradename Alkamiser IV) | 0.3 |
| Bisphenol A | 0.1 |
| Tris(nonylphenyl)phosphite | 1 |

152.4 g of Composition B were taken as example 5. For examples 6–9 152.4 g of Composition B was combined with 0.05 g of Dibenzoylmethane (sold under the tradename Rhodiastab 83), IV, I & XIII.

These samples were treated in an identical manner to that described in Section A apart from the oven temperature which was 180° C. The YI results are given in Table 4.

TABLE 4

| | YI after oven test in minutes | | | | | |
|---|---|---|---|---|---|---|
| Example | 0 | 2 | 4 | 8 | 12 | 16 | 20 |
| 5 | 9 | 12 | 14 | 19 | 22 | 24 | 25 |
| 6 | 14 | 14 | 14 | 15 | 15 | 15 | 15 |
| 7 | 8 | 8 | 9 | 10 | 11 | 12 | 15 |
| 8 | 7 | 7 | 8 | 9 | 13 | 19 | 27 |
| 9 | 7 | 7 | 8 | 9 | 12 | 18 | 29 |

C. Examples 9–12

The example compounds were tested in a rigid, pigmented PVC formulation which may be used for the manufacture of window profile. The system is stabilised by a solid Ca/Zn system. All the materials have their tradenames in parentheses.

| Composition C | |
|---|---|
| Suspension polymerised PVC resin 9K 66) | 3,000 |
| Acrylic Impact modifier (Paraloid KM355) | 210 |
| Titamium Dioxide (Kronos 2220) | 120 |
| Coated Calcium Carbonate (Polcarb SB | 150 |
| Calcium Stearate | 15 |
| Zinc Stearate | 15 |
| Mg/Al/Zn Hydroxycarbonate (Alkamiser IV) | 21 |
| Oxidised polyethylene wax (AC 316A) | 4.5 |
| Polyethylene wax (PE 520) | 4.5 |
| Synthetic Paraffin (Sasol H1) | 4.5 |

3544.5 g of Composition C was taken as example 9. For examples 10–12 this amount of Composition C was combined with 3.0 of VIII. XIV and Stearoylbenzoylmethane (Rhodiastab X5).

The mixtures were mixed in a high speed mixer (Paperuneier TGH KV8) which heated under frictionto 110° C. then cooled to 40° C. The prepared samples were then passed through a lab axtracture (Brabender DSE 35/17/D twin screw extruder coupled to a PLE651 Plasticorder) under the conditions disclosed in Table 5.

TABLE 5

| | Zone 1 | Zone 2 | Zone 3/Adaptor | Tool |
|---|---|---|---|---|
| Zone Temperatures (° C.) | 165 | 175 | 185 | 190 |
| Screw Speed - 17 rpm | | | | |
| Doser Speed - 33 rpm | | | | |

Test pieces of size 408 mm×20 mm were cut from the strip and were placed in a test oven (Werner-Mathis Thermotester) at 190° C. The Yellowness Indices are given in Table 6.

TABLE 6

| | YI after oven test in minutes | | | | | | |
|---|---|---|---|---|---|---|---|
| Example | 0 | 2 | 4 | 6 | 8 | 10 | 12 | 14 |
| 9 | 12 | 13 | 14 | 21 | 30 | 32 | 32 | 32 |
| 10 | 11 | 11 | 13 | 16 | 23 | 28 | 31 | 33 |
| 11 | 11 | 11 | 13 | 17 | 25 | 31 | 32 | 342 |
| 12 | 12 | 13 | 14 | 21 | 30 | 32 | 32 | 32 |

D. Examples 13–16

The example compounds were treated in a rigid, pigmented expanded foam formulation stabilised by a Ca/Zn solid stabiliser system.

| Composition D | |
|---|---|
| Suspension polymerised PVC resin (K 57) | 3,000 |
| process Aid (Paraloid K400) | 150 |
| Acrylic impact modifier (Paraloid KM 355) | 90 |
| Calcium carbonate (Omyalite 95T) | 240 |
| Titanium Dioxide (Kronos 2220) | 180 |
| Epoxidised Soya Bean Oil (Lankroflex E2307) | 30 |
| Calcium stearate | 15 |
| Zinc stearate | 15 |
| Mg/Al/Zn Hydroxycarbonate (Alkamiser IV) | 30 |
| Wax (Loxiol G70) | 10 |
| Wax (poxiol G60) | 10 |
| Synthetic Paraffin (Sasol SP1044) | 5 |
| Sodium Bicarbonate | 30 |

3805 g of Composition D was taken as example 13. For examples 14–16 this amount of Composition D w,as combined with 3.0 g of Rhodiastab X5, XIII & IV.

The mixtures Awere prepared in the same manner as examples 9–12 except that the temperature reached in the high speed mixer reached 100° C. The samples were treated in an identical manner to that described in Section C apart from the Brabender Doser speed which was 35 rpm.

Test pieces of size 40 mm×25 mm were cut from the extruded strip and placed in oven at 185° C. Pieces were removed from the oven at 3 minute intervals. The YI was recorded and the results are given in Table 7.

TABLE 7

| | YI after oven test in minutes | | | | | | | |
|---|---|---|---|---|---|---|---|---|
| Example | 0 | 3 | 6 | 9 | 12 | 15 | 18 | 21 |
| 13 | 12 | 13 | 14 | 16 | 21 | 24 | 25 | 28 |
| 14 | 10 | 11 | 13 | 13 | 16 | 21 | 22 | 23 |
| 15 | 6 | 7 | 8 | 11 | 14 | 17 | 21 | 24 |
| 16 | 7 | 8 | 8 | 15 | 16 | 21 | 22 | 24 |

E. Example 17–20

The examples below use a white pigmented PVC plastisol formulation, incorporating a Ba/Zn stabiliser system.

| Composition E | |
|---|---|
| Emulsion PVC resin (K-72) | 100 |
| Dioctylphthalate | 50 |
| Titanium Dioxide (sold under the trade name RFC-5) | 2 |
| Carbonated Barium Alkyl phenolate (28% Ba) | 0.5 |
| Basic Zinc octoate (22% Zn) | 0.16 |
| Diphenyl isooctyl phosphite | 0.9 |
| Diphenyl phosphite | 0.2 |
| Butoxyethoxy ethanol | 0.21 |

153.97 g of Composition E were taken as example 17. For examples 18 to 20 this amount of Composition E was combined with 0.03 g of Dibenzoylmethane, 0.03 g XV and 0.03 g XVI.

The composition described above were mixed initially by hand and then using the laboratory, triple roll mill a period of 10 minutes. The blends were then de-aerated using a Collin (type 110) laboratry mixer before being spread onto release paper to a thickness of 0.5 mm. The plastisol gelled at 185° C. for 1 minute.

The pieces of size 410 mm×20 mm were cut from the cured sheet and placed in a test oven at 190° C. The Yelowness index of the test samples are shown in Table 8.

TABLE 8

| | Y.I. after oven test in minutes | | | | | |
|---|---|---|---|---|---|---|
| Example | 0 | 2 | 4 | 6 | 8 | 10 |
| 17 | 9 | 25 | 36 | 47 | 51 | 51 |
| 18 | 4 | 9 | 19 | 33 | 45 | 50 |
| 19 | 6 | 11 | 15 | 22 | 32 | 40 |
| 20 | 4 | 9 | 12 | 21 | 33 | 42 |

F. Examples 21–26

The examples below use a filled plastisol PVC formulation stabilised by a Ca/Zn liquid system.

| Composition F | |
|---|---|
| Emulsion PVC resin (K-79) | 100 |
| Dioctylphthalate | 60 |
| Calcium Carbonate | 50 |
| Diphenyl isooctyl phosphite | 1 |
| Basic zinc octoate (22% Zn) | 0.114 |
| Carbonated Calcium Carboxylate (10% Ca) | 0.25 |
| Butyoxyethoxy ethanol | 0.606 |

211.97 g of Composition F was taken as example 21. For examples 22 to 25 this amount of Composition F was combined with 0.03 g of Dibenzoylmethane, XVI, III & VIII.

These mixtures were treated in exactly the same manner as described in Section E. The yellowness indices are given in Table 9.

TABLE 9

| | Y.I. after oven test in minutes | | | | | | | | |
|---|---|---|---|---|---|---|---|---|---|
| Example | 0 | 1.5 | 3 | 4.5 | 6 | 7.5 | 9 | 10.5 | 12 |
| 21 | 7 | 13 | 19 | 24 | 27 | 30 | 31 | 35 | 52 |
| 22 | 10 | 11 | 11 | 11 | 12 | 15 | 19 | 28 | 59 |
| 23 | 7 | 9 | 9 | 10 | 10 | 12 | 17 | 31 | — |
| 24 | 8 | 9 | 12 | 13 | 12 | 14 | 18 | 25 | 52 |
| 25 | 7 | 9 | 10 | 11 | 12 | 13 | 15 | 19 | 32 |

G. Examples 27–35

The example described herein were produced using a highly plasticised PVC formulation incorporating a Ba/Zn stabiliser system.

| Composition G | |
|---|---|
| Suspension PVC Resin (K-71) | 100 |
| Dioctylphthalate | 45 |
| Epoxidised alkyltallate | 3 |
| Diphenyl isooctyl phosphite | 0.9 |
| Diphenyl phosphite | 0.2 |
| Basic Zinc Octoate (22% Zn) | 0.16 |
| Carbonated Barium alkylphenolate (28% Ba) | 0.5 |
| Butoxyethoxyethanol | 0.21 |

149.97 g of Composition G was taken as example 27. For examples 28 to 32 this amount of Composition G was combined with 0.03 g of Rhodiastab 83; VIII, XV, XVI, and III respectively. For examples 33 and 34 149.7 g of Composition G was combined with 0,015 g of XVI and III.

The mixtures were treated in an identical manner to that described in Section B. The test results are given in Table 10.

TABLE 10

| | Y.I. after oven test in minutes | | | | | |
|---|---|---|---|---|---|---|
| Example | 0 | 8 | 16 | 24 | 32 | 40 | 48 |
| 27 | 4 | 4 | 4 | 6 | 12 | 20 | 21 |
| 28 | 9 | 10 | 10 | 10 | 10 | 12 | 14 |
| 29 | 4 | 4 | 5 | 6 | 7 | 13 | 18 |
| 30 | 3 | 4 | 4 | 6 | 9 | 13 | 17 |
| 31 | 3 | 4 | 4 | 7 | 11 | 16 | 21 |
| 32 | 4 | 5 | 5 | 6 | 9 | 13 | 20 |
| 33 | 3 | 4 | 4 | 5 | 8 | 13 | 18 |
| 34 | 3 | 4 | 5 | 5 | 6 | 11 | 14 |

H. Examples 35–40

The following examples were tested in a semi-rigid pigments formulation stabilised by the presence of a Ba/Zn stabiliser liquid system.

| Composition H | |
|---|---|
| Suspension PVC (K 64) | 100 |
| Dioctylphthalate | 27.5 |
| Epoxidised alkyl tallate | 3 |
| Titanium dioxide (sold under the tradename APP-2 | 10 |
| Diphenyl isooctyl phosphite | 0.67 |
| Diphenyl phosphite | 0.15 |
| Basic zinc octoate (22% Zn) | 0.12 |
| Carbonated Barium alkyl phenolate | 0.38 |
| Butoxyethoxy ethanol | 0.16 |

141.973 g of Composition H was taken as example 35. For examples 36–40 this amount of Composition H was combined with 0.027 g of Dibenzoylmethane, Diberizoylmethane zinc (II) complex, XVI, XIII, & XV.

The mixtures were treated in an identical manner to that described in section A. The Yellowness Index results are given in Table 11.

TABLE 11

| Example | Y.I. after oven test in minutes | | | | | | | |
|---|---|---|---|---|---|---|---|---|
| | 0 | 2.5 | 5 | 7.5 | 10 | 12.5 | 15 | 17.5 |
| 35 | 8 | 14 | 22 | 26 | 27 | 27 | 27 | 27 |
| 36 | 4 | 10 | 20 | 24 | 26 | 27 | 27 | 27 |
| 37 | 3 | 6 | 19 | 23 | 26 | 26 | 26 | 26 |
| 38 | 2 | 3 | 6 | 11 | 14 | 22 | 23 | 24 |
| 39 | 2 | 4 | 5 | 10 | 17 | 22 | 22 | 23 |
| 40 | 2 | 4 | 7 | 11 | 15 | 19 | 21 | 22 |

It is to be understood that the above described examples are by way of illustration only. Many modifications and variations are possible.

We claim:

1. A composition based on polymer and/or co-polymers of vinyl chloride comprising the following compounds expressed by weight percent relative to the weight of the polymer/co-polymer used:
    (a) from 0.1%–5% of one or more organotin salts and/or one or more divalent metal salts of a carboxylic acid or phenol; and
    (b) from 0.001%–5% of one or more metal salts of the organic compounds of general formula A

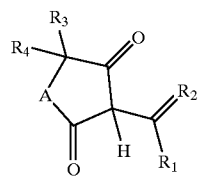

in which $R_1$ represents a linear or branched alkylene or alkenylene radical having up to 20 carbon atoms, an aralkylene radical having from 7 to 20 carbon atoms or an arylene or cycloalkylene radical having from 6 to 20 carbon atoms, the cycloalkylene radicals optionally containing carbon-carbon double bonds; these radicals optionally being unsubstituted or substituted by one or more halogen atoms, hydroxyl groups, or, for aryl or cycloalkylene radicals, by one or more methyl, ethyl or methoxy radicals, the above-mentioned radicals optionally modified by the presence in an aliphatic chain of one or more —O—, —CO— or $CO_2$— chain members or N; $R_2$ represents $O,S,NR_5$ or $NNHR_5$ wherein $R_5$ is defined as $R_1$, H or $C(S)NHR_6$ wherein $R_6$ is defined as $R_1$ or H; $R_3$ and $R_4$ are defined as $R_1$ or H and can be the same or different; A is either, O,S or $NR_7$,with $R_7$ defined as $R_1$ and H, with the exception that when $A=O,R_2 =\backslash=O$.

2. A composition as claimed in claim 1 wherein the metal component of the metal salts of the organic compounds comprises any of the following:- alkali or alkaline earth, divalent or monovalent transition metal ions or tetravalent or divalent tin.

3. A composition as claimed in claim 1 or claim 2, wherein the metal component of the metal salts of the organic compounds comprises any of the following:- barium, cadmium, zinc, magnesium, calcium, sodium, potassium or tin.

4. A composition as claimed in claim 1 wherein the composition contains any of the following:- N-phenyl 3-acetyl pyrrolidine 2,4 dione zinc complex; N-phenyl 3-acetyl pyrrolidine 2,4 dione calcium complex; N-phenyl 3-acetyl pyrrolidine 2,4 dione, barium complex; N-phenyl 3-acetyl pyrrolidine 2,4 dione, sodium salt; N-phenyl 3-acetyl pyrrolidine 2,4 dione, potassium salt; N-phenyl 3-acetyl pyrrolidine 2,4 dione, magnesium complex; N-p-methoxyphenyl 3-acetyl pyrrolidine 2,4 dione, sodium salt; N-p-methoxyphenyl 3-acetyl pyrrolidine 2,4 dione, potassium salt; N-p-methoxyphenyl 3-acetyl pyrrolidine 2,4 dione, calcium complex; N-p-methoxyphenyl 3-acetyl pyrrolidine 2,4 dione, Sodium salt; N-p-methoxyphenyl 3-acetyl pyrrolidine 2,4 dione, potassium salt; N-p-methoxyphenyl 3-acetyl pyrrolidine 2,4 dione, calcium complex; N-isopropyl 3-acetyl pyrrolidine 2,4 dione, zinc complex; N-benzyl 3-acetyl pyrrolidine 2,4 dione, zinc complex; N-benyl 3-acetyl pyrrolidine 2,4 dione, barium complex; N-phenyl 3-acetyl 5-methyl pyrrolidine 2,4 dione, calcium complex; or N-phenyl 3-phenyl acetyl pyrrolidine 2,4 dione, barium complex.

5. A composition as claimed in claim 1, wherein the metal component of the divalent metal salt comprises any of the following either alone or in combination: barium, cadmium, zinc, calcium, magnesium or lead.

6. A composition as claimed in claim 1, wherein the divalent metal salt comprises any of the following: acetates, ethyl hexanoates, octoates, stearaies, oleates, laurates, palmitates, myristates, ricinoleates, benzoates alkyl substituted benzoates, phthalates, phenates and nonyl phenates.

7. A composition as claimed in claim 1, wherein the divalent metal salt is used in combination with carboxylic acid salts of monovalent metals.

8. A composition as claimed in claim 1, wherein the composition further includes an inorganic metal salt.

* * * * *

UNITED STATES PATENT AND TRADEMARK OFFICE
CERTIFICATE OF CORRECTION

PATENT NO.    : 5,985,959
DATED         : November 16, 1999
INVENTOR(S)   : Heather Blue Harvey et al.

It is certified that error appears in the above-identified patent and that said Letters Patent is hereby corrected as shown below:

Column 7,
Lines 50-60, please delete Table 4 and replace it with the following:

TABLE 4

| | YI after oven test in minutes | | | | | | |
|---|---|---|---|---|---|---|---|
| Example | 0 | 2 | 4 | 6 | 8 | 10 | 12 |
| 5 | 9 | 12 | 14 | 19 | 22 | 24 | 25 |
| 6 | 14 | 14 | 14 | 15 | 15 | 15 | 15 |
| 7 | 8 | 8 | 9 | 10 | 11 | 12 | 15 |
| 8 | 7 | 7 | 8 | 9 | 13 | 19 | 27 |
| 9 | 7 | 7 | 8 | 9 | 12 | 18 | 29 |

Signed and Sealed this

Thirteenth Day of April, 2004

JON W. DUDAS
*Acting Director of the United States Patent and Trademark Office*